(12) United States Patent
Ferreira et al.

(10) Patent No.: US 10,274,090 B2
(45) Date of Patent: Apr. 30, 2019

(54) DUAL PARALLEL HYDRAULIC ACTUATOR

(71) Applicant: Aker Solutions AS, Lysaker (NO)

(72) Inventors: Victor Rodriguez Ferreira, Stabekk (NO); Nicholas Newlands, Snarøya (NO)

(73) Assignee: Aker Solutions AS, Lysaker (NO)

( * ) Notice: Subject to any disclaimer, the term of this patent is extended or adjusted under 35 U.S.C. 154(b) by 14 days.

(21) Appl. No.: 15/568,855

(22) PCT Filed: Apr. 27, 2016

(86) PCT No.: PCT/NO2016/050076
§ 371 (c)(1),
(2) Date: Oct. 24, 2017

(87) PCT Pub. No.: WO2016/175661
PCT Pub. Date: Nov. 3, 2016

(65) Prior Publication Data
US 2018/0100588 A1    Apr. 12, 2018

(30) Foreign Application Priority Data
Apr. 27, 2015   (NO) .................................. 20150505

(51) Int. Cl.
*F16K 31/00*      (2006.01)
*F16K 3/02*       (2006.01)
(Continued)

(52) U.S. Cl.
CPC ........ *F16K 3/0254* (2013.01); *F16K 31/1221* (2013.01); *F16K 31/1225* (2013.01);
(Continued)

(58) Field of Classification Search
CPC ............. F16K 31/1221; F16K 31/1225; F16K 3/0254; F15B 2211/8757; F15B 2211/864; F15B 20/00; F15B 15/1409
(Continued)

(56) References Cited

U.S. PATENT DOCUMENTS 2,478,811 A * 8/1949 Downs .................... E21B 34/02
                                                            251/31
3,371,582 A * 3/1968 Schmidt ............. F15B 15/1409
                                                            92/107
(Continued)

FOREIGN PATENT DOCUMENTS

EP      1084923 A1   3/2001
EP      1195530 A1   4/2002

OTHER PUBLICATIONS

Kalland, Bjørn Inge, "International Search Report," prepared for PCT/NO2016/050076, dated Jul. 25, 2016, three pages.

*Primary Examiner* — Umashankar Venkatesan
(74) *Attorney, Agent, or Firm* — Winstead PC

(57) ABSTRACT

The invention relates to agate valve hydraulic actuator, said actuator comprising a cup shaped sleeve (9) which is operably coupled to an opening or closing element (5) of the gate valve (2), the actuator further comprising a movable primary piston (13) arranged within a primary cylinder (12) arranged at the inside of the cup-shaped sleeve (9), said primary piston (13) being con figured to move the sleeve (9) and hence said opening and closing element (5) towards an open or closed position of the gate valve (2) by a force applied to the primary piston (13). The hydraulic actuator is distinctive in that it further comprising a movable secondary piston (11) arranged within a secondary cylinder (10) arranged at the inside of the cup shaped sleeve (9), said secondary piston (11) being configured to move the sleeve (9) to the same position of the gate valve (2) as the primary piston by a force applied to the secondary piston in case of failure of the primary piston (13), said primary piston (13) and secondary piston (11) are independently operable of each other.

13 Claims, 3 Drawing Sheets

(51) Int. Cl.
*F16K 31/122* (2006.01)
*F15B 15/14* (2006.01)
*F15B 20/00* (2006.01)

(52) U.S. Cl.
CPC ........... *F15B 15/1409* (2013.01); *F15B 20/00* (2013.01); *F15B 2211/864* (2013.01); *F15B 2211/8757* (2013.01)

(58) Field of Classification Search
USPC .................................................... 251/63, 62
See application file for complete search history.

(56) References Cited

U.S. PATENT DOCUMENTS

| | | | |
|---|---|---|---|
| 3,469,503 A * | 9/1969 | Halderman, Jr. ..... | F15B 11/123 92/62 |
| 4,776,562 A * | 10/1988 | Kalaskie ................ | F17C 13/04 251/63.4 |
| 5,094,270 A | 3/1992 | Reimert | |
| 5,392,807 A * | 2/1995 | Caudle ................ | F16K 31/1221 137/316 |
| 6,041,804 A | 3/2000 | Chatufale | |
| 6,244,563 B1 * | 6/2001 | Ejiri .................... | F16K 31/1225 251/331 |
| 6,257,117 B1 * | 7/2001 | Yagishita ............ | F15B 11/0325 164/314 |
| 6,688,211 B1 | 2/2004 | Viet | |
| 9,671,036 B2 * | 6/2017 | Nielsen ............... | F16K 31/1225 |
| 2002/0158217 A1 * | 10/2002 | Inoue ....................... | F16K 7/06 251/5 |
| 2005/0006609 A1 * | 1/2005 | Fukano .................. | F16K 23/00 251/63.5 |
| 2006/0197049 A1 * | 9/2006 | Hamada ............. | F16K 31/1221 251/285 |
| 2010/0181516 A1 * | 6/2010 | Palanchon et al. ..... | F16K 15/00 |
| 2013/0248001 A1 | 9/2013 | Young | |
| 2015/0096435 A1 | 4/2015 | Dalton et al. | |

* cited by examiner

DUAL PARALLEL HYDRAULIC ACTUATOR

FIELD OF THE INVENTION

The invention relates to a dual hydraulic actuator and particularly a dual parallel hydraulic actuator with totally independent piston arrangements.

TECHNICAL BACKGROUND OF THE INVENTION

This technology are applicable in actuators both subsea and topside to increase the reliability and redundancy of the workover and XMT system.

This actuator design is particularly useful in the Surface Flow Tree (SFT) in open water workover systems. In a workover system, several valves' control systems are connected to each other in order to sequentially close down a test-producing oil well in case of both normal operation procedure and in case of an emergency. All these valves are controlled hydraulically by a very complex and redundant system. The Surface flow tree is positioned on top of the riser, topside in the workover vessel above the drill floor. The tension system on the vessel is connected to the surface flow tree and provides tension and heave compensation to the top part of the workover riser (above tension ring).

While the system is in operation, the surface flow tree and riser system are moving vertically relative to the workover vessel. The heave compensation system on the vessel ensures a constant tension load while the vessel is allowed to move freely from wave and wind loading. A normal scenario is a heave motion of up to typically +/−4 meters.

The surface flow tree has a production outlet and also a kill inlet through wing blocks. On these blocks there is a need for fail-safe-close (FSC) valves which is designed to shut down the flow of produced fluids in case of power loss or other controlled shut down situations. The normal and emergency fail-safe close-function is ensured mechanically by a powerful spring inside the valve actuator.

This spring is charged when the actuator is energized hydraulically to open. In short, the actuator is only driven hydraulically to open, while the spring is the only closing power. In early designs, this "open" function was done by an actuator piston arrangement with one primary and one backup seal arrangement in that single piston. Should the seal assembly fail completely, the crew needed to climb onto the vertically moving surface flow tree to override the actuator with special tools.

The previously known dual hydraulic actuators are using two pistons in series. The secondary piston is only used as a backup. These two pistons are not mechanically independent of each other. A mechanical failure in the primary piston or in one of the primary pistons can also cause failure in the secondary pistons.

As an example, if the primary piston jams or there is a scratch in the sealing surface there will be a leakage between the primary piston and the secondary piston and the actuator will not be able to operate the valve.

The previously known dual hydraulic actuators also often have one hydraulic main piston arrangement and a secondary arrangement that is manually operated by a ROV.

As the technology moves forward and the HSE requirements in the offshore business become more strict, the scenario where operators are manually operating the surface flow tree while in motion and operation is not allowed. There is therefore a need for an actuator arrangement that is safe and reliable in operation and also an arrangement that could function automatically.

The following invention description describes an actuator design with separate hydraulic piston arrangements in the actuator to prevent the actuator to fail when one of the pistons are damaged or do not work properly.

This actuator according to the invention have one primary piston arrangement, which normally operate the actuator, and one secondary piston arrangement which will be able to fully operate the valve if the primary piston arrangement fails. The piston arrangements are fully independent of each other both mechanically and hydraulically. A failure of one of the pistons will not affect the function of the other piston.

The actuator according to the invention also removes the need for manual operator involvement and increase the reliability of the actuator.

The actuator is more robust and guarantees a safe backup actuation mode.

In addition, the primary and the secondary actuation have an identical cross sectional area and operate on an identical pressure. The actuator thus having an almost identical operating signature independent of the piston arrangement that is in function, both when opening and closing a gate valve.

The actuator according to the invention could stay in a retracted position or can be operated by pumping hydraulic fluid in a primary or secondary chamber to operate the primary or the secondary piston.

This technology could be equally successfully utilized in other actuators both subsea (deep) and topside in the future to increase reliability and redundancy of the workover and subsea production systems, such as Christmas tree, manifolds etc.

The actuator according to the invention is not therefore not limited to a specified actuator used in a wing valve type for surface and submerged surface tree applications as described above.

OBJECTS OF THE INVENTION

The dual parallel hydraulic actuator has two totally independently operable pistons, both a mechanically independent system and a hydraulically independent system. The actuator can be operated by using any of the hydraulic chamber, creating redundancy.

Any failure on the primary system will not prevent the secondary from working properly as a backup. Thus, this invention is more robust and guarantees a safe backup actuation mode. A failure on one of the pistons will therefore not affect the function of the other.

As an example, if the primary piston jams or there is a scratch in the primary sealing surface, the actuator will be able to operate the valve using the secondary piston.

Additionally, the primary and the secondary actuation have an identical cross sectional area and operate on an identical pressure. It therefore develops almost identical operating signature either if the actuator is operated by the primary or the secondary piston arrangement, both when opening or closing of the valve.

The system can stay in retracted position where no piston is energized or it can be operated by pumping hydraulic fluid in the primary or secondary chamber.

The actuator according to the invention is compact due to the concentrically arranged piston arrangements.

The actuator according to the invention having fluid passages in the sleeve and in the first end plate to release the actuator quickly (fail safe) and to prevent hydraulic lock when the sleeve is returning to the resting position.

SUMMARY OF THE INVENTION

The invention relates to a gate valve hydraulic actuator, said actuator comprising a cup shaped sleeve which is operable coupled with an opening or closing element of the gate valve. The actuator further comprising a movable primary piston arranged within a primary arranged at the inside of the cup shaped sleeve, said primary piston being configured to move the sleeve and hence said opening and closing element towards an open or closed position of the gate valve by a force applied to the primary piston. The invention being distinctive in that a movable secondary piston arranged within a secondary cylinder situated at the inside of the cup shaped sleeve, said secondary piston being configured to move the sleeve to the same position of the gate valve as the primary piston by a force applied to the secondary piston in case of failure of the primary piston, said primary and secondary piston are independently operable of each other.

This provides a fail safe opening or closing of a gate valve. The systems are independent of each other both mechanically and hydraulically.

If one of the piston arrangements is defect the other piston arrangement could open or close the gate valve. The actuator having separate hydraulic supply arrangement and separate chambers so that the actuator can operate both hydraulically and mechanically independent of each other.

Preferable embodiments of the actuator are defined in the dependent claims, to which reference is made.

DETAILED DESCRIPTION OF THE INVENTION

Figure 1:
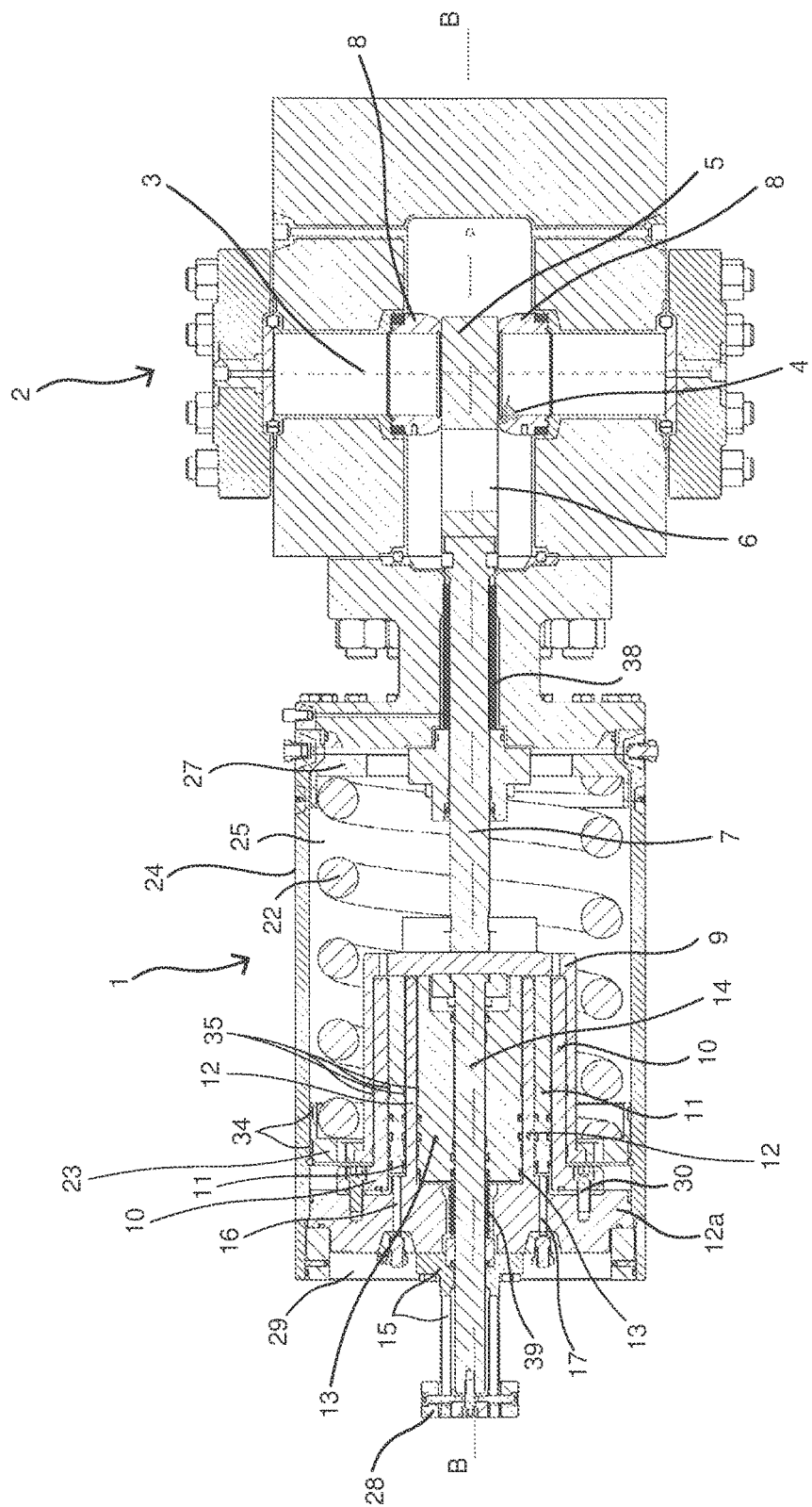
FIG. 1 shows a cross sectional area of an actuator according to the present invention in a retracted position. The cross section is shown through the line A-A of FIG. 2.

FIG. 1 shows an actuator 1 connected to a gate valve 2. The actuator 1 is adapted to open and close the gate valve 2.

In the figure, the actuator 1 is shown in a retracted position. This means that no piston is energized.

The retracted position of the actuator causes the gate valve 2 to be in a closed position. There is no flow through a cylindrical passage 3 in the gate valve 2 from the upstream side to a downstream side. A gate 4 in the gate valve 2 is in this position blocking the flow path with a solid portion 5 of the gate 4.

The gate valve 2 shown in the figure is a conventional gate valve 2 with annular seats 8 on the upstream side and the downstream side of the gate valve 2 surrounding the passage 3. These seats 8 are abutting the solid portion 5 of the gate 4 when the gate 2 is in closed position The gate 4 further comprises a circular opening 6 with substantially the same dimension as the diameter of the passage 3 in the gate valve 2. The gate valve 2 is open when the gate 4 is moved to a position where the circular opening 6 of the gate 4 is corresponding with the passage 3 allowing a fluid to flow in the passage 3 from the upstream side to the downstream side of the gate valve 2.

Another embodiment of the invention is that the gate valve is open when the actuator 1 is in the retracted position. This is called a failsafe open gate valve while the first embodiment is a failsafe closed gate valve. This will be described further below.

The actuator 1 according to the invention is connected to the gate valve 2 through a stem 7. The stem 7 is in one end connected to the movable gate 4 in the gate valve 2 and in the other end connected to a sleeve 9 arranged within the actuator 1. Both connections could be made through bolts or other fixed connection methods. The sleeve 9 is arranged movable within the actuator 1.

The sleeve 9 is annular with a cup shape. A primary cylinder 12 with a primary piston 13 and a secondary cylinder 10 with a secondary piston 11 are arranged at the inside of the sleeve 9. The primary piston 13, the primary cylinder 12, the secondary piston 11 and the secondary cylinder 10 are arranged concentrically. The sleeve 9 having a free end facing away from the gate valve 2.

The secondary cylinder 10 is arranged adjacent the sleeve 9 at the inside of the sleeve 9. The primary cylinder 12 is arranged inside of the secondary cylinder 10.

The primary cylinder 12 is integrated with an end wall 12a situated between the first and second piston arrangements and the piston retainer ring 29. The end wall has a disc shape located adjacent the piston retainer ring 29.

The second cylinder is coupled to the end wall 12a through bolts, screws 30 or similar fastening means.

Between the primary cylinder 12 and the secondary cylinder 10 there is arranged a secondary piston 11. The secondary piston 11 is movable in relation to the primary and secondary cylinders 10, 12. At the inside of the primary cylinder 12, the primary piston 13 is arranged adjacent the primary cylinder 12.

The primary piston 13 is arranged movable in relation to the first cylinder 12. The sleeve 9, primary and secondary pistons 13, 11 and stem 7 is movable in the longitudinally direction of the actuator 1.

There is arranged an override stem 14 in the center of the actuator 1. The override stem 14 is in one end attached to the sleeve 9 and the other end is extending in the longitudinal direction of the actuator 1. The override stem 14 is extending inside an override stem casing 15. The override stem casing 15 having a T-shape and is arranged at a first short end of the actuator 1 which is facing away from the gate valve 2 and having a free end extending outside of the actuator 1. A small end portion of the override stem 14 is moving inside the override stem casing 15 and there is an indicator ring 28 attached to the override stem 14. The indicator ring 28 could for instance be attached through screws or bolts or other fastening means. The indicator ring 28 is slidably attached to the override stem casing 15 and provides the visual indication of the actuator 1 and valve 2 position.

In FIG. 1 the indicator ring is situated at or near the free end of the override stem casing 15. This indicates that the gate valve 2 is in the retracted, closed position and that none of the piston arrangements are energized.

Figure 2:
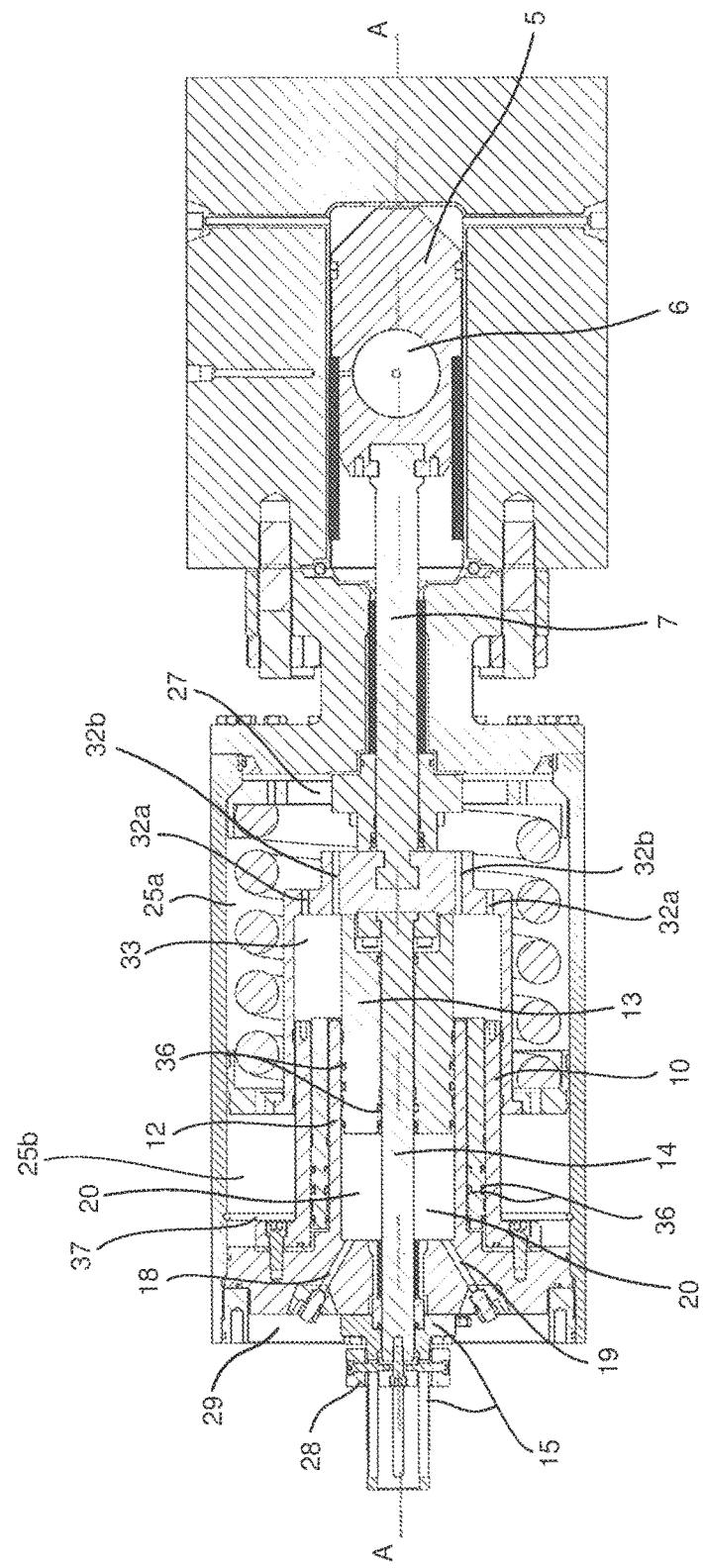
FIG. 2 shows a cross section area of an actuator according to the present invention in an extended position where the first piston is stroked. The cut is shown through the line B-B of FIG. 1.

In FIG. 2 the indicator ring 28 is situated in a position near the piston ring retainer 29 and indicates that the gate valve 2 is in the extended, open position. In this position, one of the piston arrangements is energized.

By the wording energized it is meant that one of the piston arrangements is pushing the sleeve towards the gate valve so that a spring surrounding the sleeve is compressed.

It is also possible to perform a mechanical movement of the sleeve towards the gate valve 2 as in previously known actuator solutions. In order to do that the override stem casing 15 must be replaced by a similar part, such as a ROV interface. The actuator can then be operated by a ROV.

This interface is not shown in the figures. This arrangement provides a third possibility to open or close the gate valve 2 if the primary piston arrangement or the secondary piston arrangement are both disabled.

The primary piston 13, the primary cylinder 12, the secondary piston 11, the secondary cylinder 10 and the sleeve 9 are arranged concentric with the override stem 14.

The components of the actuator 1 are enclosed by a spring canister 24.

The actuator 1 having a piston retainer ring 29 arranged at the end facing away from the gate valve 2. This piston retainer ring 29 is arranged in the space between the override stem casing 15 and the spring canister 24.

On the outside of the sleeve 9 there is arranged a spring 22. The spring 22 is limited in one end by a movable first end plate 23 and in the other end the spring 22 is limited by a fixed second end plate 27, facing the gate valve 2.

The first end plate 23 is arranged between the spring canister 24 surrounding the actuator 1 and the sleeve 9.

The first end plate 23 is adapted to move together with the sleeve 9 and the spring 22 in the same direction as the sleeve 9.

There are arranged wear bands 34 between the first end plate 23 and the spring canister 24. The purpose of the wear bands are to prevent a metal to metal connection when the sleeve 9 (and first end plate 23) move in relation to the spring canister 24. The wear band 34 is not a seal and the fluid is allowed to flow from one side of the wear band to the other. There could be a plurality of wear bands 34 arranged between the first end plate 23 and the spring canister 24.

Similar wear band arrangements 35 are arranged between all movable part of the arrangement, for example between the sleeve 9 and the secondary cylinder 10, between the secondary cylinder 10 and the secondary piston 11, between the secondary piston 11 and the first cylinder 12, the first cylinder 12 and the first piston 13 and the first piston and the override stem 14 for the same purpose as described above.

In addition to this there are arranged seals 36 between the secondary cylinder 10 and the secondary piston 11, between the secondary piston 11 and the first cylinder 12, between the first cylinder 12 and the first piston 13 and between the first piston 13 and the override stem 14 to provide a seal tight first chamber 20 and a seal tight second chamber 21. The chambers 20, 21 will be described further below.

The first end plate 23 is arranged at the free end of the sleeve 9 facing the piston retainer ring 29 of the actuator 1. The first end plate 23 divides the spring chamber 25 into two parts or sections; an inner spring chamber 25a where the spring 22 is situated, and an outer spring chamber 25b, situated between the first end plate 23 and the wear band 34. The inner and outer chamber 25a, 25b are not separate chambers, but sub chambers of the spring chamber 25. The sub-chambers 25a, 25b are always communicated through one or several small venting holes 26 and between the first end plate 23 and the spring canister 24 and the pressure on both sides of the first end plate are substantially equal.

The purpose of the spring 22 is to retract the sleeve 9 from a stroked position of the actuator 1 back to the retracted position by the spring force. A stroked position is when the actuator 1 is energized so that the gate valve 2 is open (or closed if the gate valve 2 has a failsafe closed position).

In the retracted position of the system, the sleeve 9 is forced by the spring 22 to a position near the secondary cylinder 10. In this position both piston 13 and 11 are in a retracted position.

The spring 22 is also called a failsafe spring as it will force the actuator 1 back to a retracted position when the actuator 1 is not energized. Depending on the gate valve 2 is open or closed when the actuator 1 is in this retracted position, the gate valve 2 could be fail safe open or fail safe closed as described earlier.

The venting holes 26 through the first end plate 23, as described above, are fluid connecting the outer and inner spring chamber 25a, 25b. The purpose of these venting holes 26 are to allow a venting of the fluid between both sides of the first end plate 23 and thus allow for a quick retraction of the sleeve 9 from the stroked position to the retracted position. The spring 22 is responsible for the fail-safe retraction of the spring 22 as described above. The retraction of the actuator 1 from the stroked position back to the retracted position is to be performed in preferably less than 2 sec. There could be a plurality of venting holes 26 in the first end plate 23.

The Figure also shows a retainer ring 37. The position of this retainer 37 ring is best shown in FIG. 2. The retainer ring 37 is used during assembly and disassembly to retain the first end plate 23 and the spring 9. This is performed in a conventional, well known manner.

FIG. 1 also shows a main seal stack 38 arranged between the stem 7 and the actuator 1 in the end facing the gate valve 2, and a seal stack 39 arranged between the override stem 14 and the end wall 12a in the opposite end of the actuator.

FIG. 2 shows the actuator 1 in the primary stroked position where the primary piston 13 is moved towards the gate valve 2.

The figure shows that the end wall 12a has inlet ports and outlet ports 16, 17, 18, 19 in connection with a primary and secondary hydraulic chamber 20, 21 at the inside of the actuator 1. The end wall 12a having preferably 4 hydraulic ports, two inlet ports 16, 18 and two outlet ports 17, 19. The ports 18 and 19 fluid communicate with the primary hydraulic chamber 20 while ports 16 and 17 fluid communicate with the secondary hydraulic chamber 21.

The primary hydraulic chamber 20 is defined by the space within the primary cylinder 12, the primary piston 13 and the override stem 14. The primary hydraulic chamber 20 is expanding as hydraulic fluid is supplied to the chamber 20. This causing the primary piston 13 to move towards the sleeve 9 and consequently the gate 4 will be moved accordingly so that the gate valve 2 opens. As an embodiment of the invention, the gate valve 2 could be closed in the stroked position as described earlier.

There are sleeve openings 32a, 32b in the sleeve 9 which allows fluid to move from the spring chamber 25 towards a space 33 at the inside of the sleeve 9 which appear when the sleeve 9 is moved by the primary 11 or secondary piston 13.

In the opposite action, the primary hydraulic chamber 20 will decrease when the sleeve 9 is retracted by the spring 22 in the actuator 1.

This will occur when there is no more supply of hydraulic fluid into the chamber 20 and the fluid are allowed to be discharged through the outlet port 19.

The spring 22 and consequently the sleeve 9 will force the primary piston 13 to move back and the hydraulic fluid will be discharged from the primary hydraulic chamber 20 through the port 19 in the primary cylinder 12. The volume of the primary hydraulic chamber 20 will consequently decrease. The hydraulic fluid is supplied through a first inlet port 18 and discharged through a first outlet port 19 in end wall 12*a*.

As a consequence of the moving of the sleeve towards the retracted position, the fluid within the space 33 at the inside of the will be forced through the sleeve openings 32*a*, 32*b* towards the spring chamber 25*a*.

Figure 3:
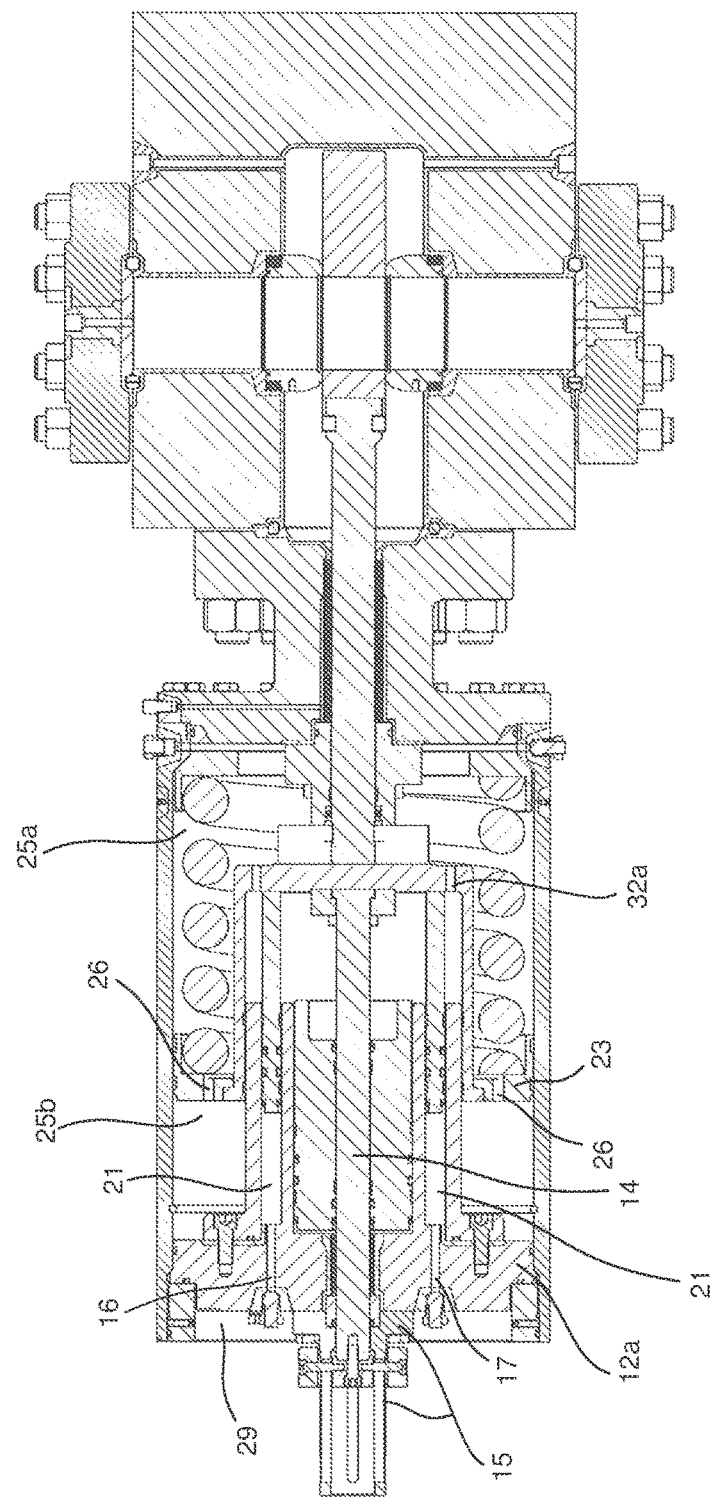
FIG. 3 shows a cross section area of an actuator according to the present invention in an extended position, where the secondary piston is stroked. The cross section is the same as in FIG. 1, a cut through the line A-A of FIG. 2.

FIG. 3 shows the actuator 1 in a secondary stroked position using the secondary piston 11. The second hydraulic chamber 21 is defined by the space within the primary cylinder 12, the secondary cylinder 10 and the secondary piston 11.

The secondary hydraulic chamber 21 is expanding when the second hydraulic fluid is supplied into the secondary hydraulic chamber 21 similar to the expanding of the primary hydraulic chamber 20 through a port 16 in the end wall 12*a*. The secondary piston 11 is consequently moved by the hydraulic fluid towards the sleeve 9 and pushes the sleeve 9, stem 7 and gate 4 to an open valve position. (Or closed as described earlier)

In the opposite action the secondary hydraulic chamber 21 will decrease when the sleeve 9 is retracted by the spring 22 in the actuator 1. This will occur when there is no more supplying of hydraulic fluid into the chamber 21 and the fluid is allowed to be discharged through the outlet port 17.

As for the movement of the sleeve 9 with the primary piston 13 the openings 33*a*, 33*b* in the sleeves 9 provides easy movement of the sleeve and prevents pressure buildup in either the space 33 or spring chamber 25*a* when the sleeve is moved towards the extended position or towards the retracted position.

The spring 22 and consequently the sleeve 9 will force the secondary piston 11 to move back and the second hydraulic chamber 21 will decrease. The second hydraulic fluid is supplied though a second inlet port 16 and discharged through a second outlet port 17.

The first and second hydraulic fluid is arranged in complete independent system. The primary and secondary piston arrangement are also totally mechanically independent of each other.

The primary fluid chamber 20 having the same area as the secondary fluid chamber 21 so that the same force is required to move the primary piston 13 as well as the secondary piston 11.

The second piston 13 is not moved when the primary piston 11 is activated or in use. The primary piston 11 is not moving when the secondary piston 13 is activated or in use. This result in two mechanically and hydraulically independent system in the actuator 1 which are independently operated.

The embodiment in the FIGS. 1-3 shows an actuator 1 and gate valve 2 where the gate valve 2 is closed in the retracted or rest position of the actuator 1. In the stroked position, the gate valve 2 is forced by the actuator 1 to an open position. It is also possible to as mentioned above to arrange a gate valve 2 so that the gate valve 2 is open in the retracted or rest position allowing the fluid flow from upstream to the downstream in the passage 3. The stroked position of the actuator 1 is thus the position when the gate valve is closed. This is a possible embodiment of the invention.

Another embodiment of the invention is to arrange a similar actuator 1 at the opposite side of the gate valve. In this embodiment, there is no need for a spring since the actuators then will move the gate from opposite sides. This would allow a fail as is actuation with bidirectional dual hydraulic open and close system.

The current invention may also be adapted and utilized in connection with such application by variations of what has already been described. Accordingly, the actuator of the invention can include any features or steps as here described or illustrated, in any operative combination, each such combination is an embodiment of the invention.

The invention claimed is:

1. A gate valve hydraulic actuator comprising:
   a cup shaped sleeve which is operably coupled to an opening or closing element of the gate valve;
   a movable primary piston arranged within a primary cylinder arranged at the inside of the cup-shaped sleeve, the primary piston being configured to move the sleeve and hence the opening and closing element towards an open or closed position of the gate valve by a force applied to the primary piston; and
   a movable secondary piston arranged within a secondary cylinder arranged at the inside of the cup shaped sleeve, the secondary piston being configured to move the sleeve to the same position of the gate valve as the primary piston by a force applied to the secondary piston in case of failure of the primary piston, the primary piston and secondary piston are independently operable of each other, such that the primary piston is stationary positioned within the primary cylinder when the secondary piston is being moved/activating the gate valve, the secondary piston being stationary positioned within the secondary cylinder when the primary piston is being moved/activating the gate valve.

2. The gate valve hydraulic actuator according to claim 1, wherein the secondary piston is arranged annular and concentric in relation to the primary piston.

3. The gate valve hydraulic actuator according to claim 1, wherein the gate valve hydraulic actuator comprises a return spring arranged in a spring chamber seated around the sleeve, the return spring is adapted to move the sleeve back to a resting position in the opposite direction than the direction of movement of the sleeve by the actuation of the primary piston or secondary piston.

4. The gate valve hydraulic actuator according to claim 3, wherein the sleeve having a fluid passage from an inner volume of the spring chamber to a space within the sleeve in order to release hydraulic pressure from the space such that hydraulic lock is avoided when the sleeve is returning to the resting position.

5. The gate valve hydraulic actuator according to claim 1, wherein the return spring is secured to the sleeve by a first end plate, the first end plate having at least one venting hole preventing fluid lock when returning the sleeve to the resting position.

6. The gate valve hydraulic actuator according to claim 1, wherein the primary piston or secondary piston is in direct contact with the sleeve when moving the sleeve.

7. The gate valve hydraulic actuator according to claim 1, wherein the sleeve is annular and concentric in relation to the primary piston.

8. The gate valve hydraulic actuator according to claim 1, wherein the gate valve hydraulic actuator having a primary hydraulic chamber defined within the primary cylinder and the gate valve hydraulic actuator having a secondary hydraulic chamber defined within the primary cylinder and the secondary cylinder, the primary and secondary chambers being coupled to separate independent supply systems.

9. The gate valve hydraulic actuator according to claim 1, wherein the hydraulic actuator comprising an end wall with a first port for supplying or discharging hydraulic fluid into the primary hydraulic chamber and a second port for supplying or discharging hydraulic fluid into the secondary chamber.

10. The gate valve hydraulic actuator according to claim 1, wherein the primary piston is movable by increasing the pressure in the primary hydraulic chamber, the secondary piston is movable by increasing the pressure in the secondary hydraulic chamber.

11. The gate valve hydraulic actuator according to claim 1, wherein the gate valve hydraulic actuator having an override stem acting on the sleeve in order to manually operate the gate valve hydraulic actuator.

12. The gate valve hydraulic actuator according to claim 1, wherein the secondary chamber having the same cross sectional area as the first chamber.

13. The gate valve hydraulic actuator according to claim 1, wherein the primary piston is mechanically independent of the secondary piston.

* * * * *